United States Patent [19]

Bailly et al.

[11] Patent Number: 5,744,068
[45] Date of Patent: Apr. 28, 1998

[54] BLENDS OF POLYPHENYLENE ETHERS AND POLYESTERAMIDES

[75] Inventors: Christian Maria Emile Bailly, Brasschaat, Belgium; Bret Ja Chisholm, Mt. Vernon, Ind.; Henricus Gerardus C. Denissen, Weelde, Belgium

[73] Assignee: General Electric Company, Pittsfield, Mass.

[21] Appl. No.: 797,370

[22] Filed: Feb. 7, 1997

Related U.S. Application Data

[63] Continuation of Ser. No. 590,852, Jan. 24, 1996, abandoned.
[51] Int. Cl.$^6$ .............. C08L 71/12; C08L 77/12
[52] U.S. Cl. .............. 525/391; 525/397; 525/66; 525/68
[58] Field of Search .................. 525/391, 397

[56] References Cited

U.S. PATENT DOCUMENTS

| | | | |
|---|---|---|---|
| 2,856,385 | 10/1958 | Van Den Berghe et al. | 528/292 |
| 3,849,514 | 11/1974 | Gray, Jr. et al. | 525/425 |
| 4,081,428 | 3/1978 | Thompson | 525/437 |
| 4,116,943 | 9/1978 | Ducarre | 528/292 |
| 4,129,715 | 12/1978 | Chen et al. | 528/67 |
| 4,145,372 | 3/1979 | Murray et al. | 525/166 |
| 4,209,607 | 6/1980 | Shalaby et al. | 528/291 |
| 4,315,086 | 2/1982 | Ueno et al. | 525/391 |
| 4,386,174 | 5/1983 | Cogswell et al. | 524/27 |
| 4,501,879 | 2/1985 | Barbee et al. | 528/288 |
| 4,579,914 | 4/1986 | Nelb, II et al. | 525/425 |
| 4,614,815 | 9/1986 | Cognigni et al. | 560/88 |
| 4,649,180 | 3/1987 | Chen et al. | 525/462 |
| 4,664,972 | 5/1987 | Connolly | 428/290 |
| 4,732,937 | 3/1988 | Sybert | 525/397 |
| 4,732,938 | 3/1988 | Grant et al. | 525/397 |
| 4,845,160 | 7/1989 | Sybert | 525/391 |
| 4,868,277 | 9/1989 | Chen | 528/272 |
| 4,873,286 | 10/1989 | Gallucci et al. | 525/397 |
| 4,952,629 | 8/1990 | Liang | 525/66 |
| 4,994,531 | 2/1991 | Brown | 525/391 |
| 5,010,144 | 4/1991 | Phanstiel, IV et al. | 525/397 |
| 5,028,649 | 7/1991 | Efner | 524/394 |
| 5,089,566 | 2/1992 | Brown et al. | 525/396 |
| 5,089,567 | 2/1992 | Phanstiel et al. | 525/397 |
| 5,091,494 | 2/1992 | Leistner et al. | 528/45 |
| 5,096,979 | 3/1992 | Brown et al. | 525/396 |
| 5,110,896 | 5/1992 | Waggoner et al. | 528/190 |
| 5,132,361 | 7/1992 | Shea et al. | 525/66 |
| 5,132,373 | 7/1992 | Khouri et al. | 525/390 |
| 5,153,267 | 10/1992 | Brown et al. | 525/397 |
| 5,153,290 | 10/1992 | Khouri et al. | 526/266 |
| 5,210,191 | 5/1993 | Phanstiel et al. | 544/214 |
| 5,212,255 | 5/1993 | Khouri et al. | 525/391 |
| 5,214,099 | 5/1993 | Khouri et al. | 525/149 |
| 5,247,006 | 9/1993 | Khouri et al. | 524/508 |
| 5,321,099 | 6/1994 | Goldwasser et al. | 525/432 |
| 5,510,451 | 4/1996 | Gaymans et al. | 528/288 |

FOREIGN PATENT DOCUMENTS

| | | |
|---|---|---|
| 0 058938 A1 | 9/1982 | European Pat. Off. |
| A2 0 143 953 | 6/1985 | European Pat. Off. |
| 0 271 914 A2 | 6/1988 | European Pat. Off. |
| 0 315 027 A2 | 10/1989 | European Pat. Off. |
| 0438128 A2 | 1/1991 | European Pat. Off. |
| 0 437 981 A1 | 7/1991 | European Pat. Off. |
| 0 445 548 B1 | 9/1991 | European Pat. Off. |
| 0 457 564 A1 | 11/1991 | European Pat. Off. |
| 0 608 976 A1 | 8/1994 | European Pat. Off. |
| 2 299 357 | 10/1976 | France |
| 271 823 A3 | 9/1989 | Germany |
| 56-103221 | 8/1981 | Japan |
| 56-147842 | 11/1981 | Japan |
| 82-57137321 | 8/1982 | Japan |
| 57-207643 | 12/1982 | Japan |
| 57-207644 | 12/1982 | Japan |
| 57-209954 | 12/1982 | Japan |
| 60-229919 | 11/1985 | Japan |
| 61-081453 | 4/1986 | Japan |
| 3255124 | 11/1991 | Japan |
| 4202461 | 7/1992 | Japan |
| 4202462 | 7/1992 | Japan |
| 5086267 | 4/1993 | Japan |
| 5117505 | 5/1993 | Japan |
| 6041400 | 2/1994 | Japan |
| 2 012 288 | 7/1979 | United Kingdom |
| 1365952 | 11/1994 | United Kingdom |

OTHER PUBLICATIONS

Chemical Abstract—AN 121:110510 CA.
Gaymans R.J., DeHaan J.L., Van Niewenhuize O., J.Pol.Sci.Chem. 31 575 (1993).
Williams J.L.R., Laakso T.M., contois L.E., J.Pol.Sci. 61 353 (1962).
Della Fortuna G., Oberrauch E., Salvatori T., Sorta E., Bruzzone M., Polymer 18 269 (1977).
Delimony D., Bailly C., Deveaux J., Legras R., Pol.Eng-.Sci.& Eng. 28 104 (1988).

(List continued on next page.)

Primary Examiner—David Buttner

[57] ABSTRACT

Disclosed are thermoplastic blends of polyesteramides and poly(phenylene ether) resins as well as methods for preparing said polyesteramides and polycarbonate blends thereof. Preferred polyesteramides are those comprising amide units of formula (I)

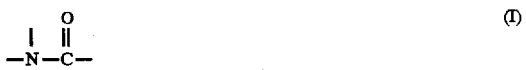

and ester units of formula (II)

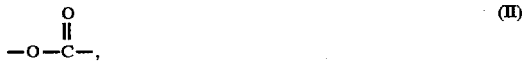

wherein the ratio of (I) to (II) is at least 1:1, and more preferably wherein at least 80% of the units of formula (I) are separated by at least one of the units of formula (II). The thermoplastic blends may additionally contain compatibilizers for the polyesteramide and poly(phenylene ether) resins.

30 Claims, No Drawings

OTHER PUBLICATIONS

Aharoni S.M., Macromolecules 21 1941 (1988).
Yamazaki, N., Masumotom., Higashi F., J. Polym.Sci., Polym.Chem.Ed 13 1373 (1975).
De Candia F., Maglio G., Palumbo R., Polym.Bull. 8 109 (1982).

Yamada K., Hashimoto K., Takayanagi M., Murata Y., J.Appl. Polym.Sci. 33 1649 (1987).

Manzini, G., Crescenzi, V., Ciana, A., Ciceri, L., Fortuna, G. Della, and Zotteri, L. European Polymer Journal, 1973, vol. 9, pp. 941–951.

BLENDS OF POLYPHENYLENE ETHERS AND POLYESTERAMIDES

This is a continuation of application Ser. No. 08/590,852, filed Jan. 24, 1996, now abandoned.

FIELD OF THE INVENTION

The present invention relates to blends of polyesteramide copolymers and poly(phenylene ether) resins. The present invention further comprises blends of polyesteramides and poly(phenylene ether) resins wherein the polyesteramide copolymer has a specific uniform structure. The present invention also comprises methods for making blends of polyesteramide copolymers and poly(phenylene ether) resins as well as useful articles of manufacture molded therefrom.

BACKGROUND OF THE INVENTION

Poly(phenylene ether) resins (referred to hereafter as "PPE") are commercially attractive materials because of their unique combination of properties, including, for example, high temperature resistance, dimensional and hydrolytic stability and electrical properties. Furthermore, the combination of PPE with polyesters into compatibilized PPE-polyester blends has been sought after for additional overall properties such as, for example, chemical resistance, high strength and high flow. Examples of such compatibilized blends can be found in U.S. Pat. Nos. 4,845,160, 5,089,566, 5,153,267, 5,247,006, 5,010,144 and 5,089,567, which are incorporated herein by reference. The properties of these blends can be further enhanced by the addition of various additives such as impact modifiers, heat stabilizers, antioxidants and fillers.

EP-A-0 315 027 decribes copolymers of the gerneral formula:

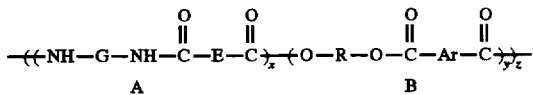

In this formula x, y and z are each integers from 1 to 100,000. G may be the residue of tetramethylenediamine, E may be the residue of terephthalic acid, R may be the residue of 1,4-butanediol, Ar is a divalent aromatic carboxylic group. Units A comprise from about 1 to about 99 percent by weight of said copolymer and units B comprise from about 99 to about 1 percent by weight of said copolymer. Said copolymers can be block copolymers, "alternating" copolymers, or random copolymers.

Polyesteramide resins wherein R and G are the residue of 1,4-butanediol and E and Ar are paraphenylene radicals have been disclosed in commonly owned U.S. Pat. No. 5,510,951 (Gaymans, et al.), filed Nov. 22, 1991. Polyesteramide resins wherein R can be alkyl other than the residue of 1,4-butanediol have been disclosed in commonly owned application Ser. No. 08/397,324 (abandoned) (Bailly, et al.), filed Mar. 1, 1995. Blends of polycarbonate resins and polyesteramide resins have been disclosed in commonly owned and pending application Ser. No. 08/397,327 (Bailly, et al.), filed Mar. 1, 1995.

DESCRIPTION OF THE PREFERRED EMBODIMENTS

Polyesteramide resins (hereinafter referred to as PEA) are, per se, known in the art. PEA refers to polymers comprising units represented by the amide formula (I):

and the ester formula (II):

The PEA of the present invention are substantially aliphatic. Substantially aliphatic PEA refers to PEA containing at least about 10 mol %, preferably at least about 20 mol %, aliphatic residues in the PEA.

In a broad sense, polymers containing all ratios of formula (I) to formula (II) are possible and at the extreme where the amount of formula (II) in the polymers approaches zero, the polymers would be polyamide resins and conversely, where the amount of formula (I) in the polymers approaches zero, the polymers would be known as polyester resins. For the present invention, it is preferred that the ratio of units of formula (I) to units of formula (II) be about 1 to 1 or less, preferably about 1 to 3 or less.

The amide formula (I) is generally derived from a reaction between (i) compounds having at least one amine group, represented by the general formula (III):

and (ii) compounds having at least one moiety having a carbonyl group, or a moiety capable of forming a carbonyl group, and capable of reacting with the amine of formula (III), and represented by the general formula (IV):

In formula (III), each $R_1$, $R_2$, and $R_3$ can independently be a hydrogen, a $C_{1-20}$ alkylene or $C_{6-20}$ arylene group with the proviso that at least one of $R_1$, $R_2$, or $R_3$ be either a hydrogen or a good leaving group, and with the proviso that at least one of $R_1$, $R_2$, or $R_3$ also contain at least one reactive moiety selected from the group consisting of amine, hydroxyl, carboxylic acid, imido, anhydride, ester, epoxy, carboxylic acid salt, or mixtures of the foregoing. Illustrative examples for formula (III) include:

ammonia,
dimethylenediamine,
trimethylenediamine,
tetramethylenediamine,
pentamethylenediamine,
hexamethylenediamine,
trimethylhexamethylenediamine,
m-phenylenediamine,
p-phenylenediamine;
4,4'-diaminodiphenylpropane,
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);

1,5-diaminonaphthalene;
3,3-dimethylbenzidine;
3,3-dimethoxybenzidine;
2,4-bis(beta-amino-t-butyl)toluene;
bis(p-beta-amino-t-butylphenyl)ether;
bis(p-beta-methyl-o-aminophenyl)benzene;
1,3-diamino-4-isopropylbenzene;
1,2-bis(3-aminopropoxy)ethane;
benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
isophorondiamine;
bis(3-aminopropyl)sulfide;
N-methyl-bis(3-aminopropyl)amine;
heptamethylenediamine;
nonamethylenediamine;
decamethylenediamine;
aminophenyl sulfones;
aminophenyl acetic acids;
4-(4-aminophenyl)butyric acids;
4-amino-1,8-naphthalic anhydride;
3-amino-2-naphthoic acid;
5-amino-isophthalic acid;
2-(2-aminoethoxy)ethanol;
4-(aminomethyl)benzoic acid;
4-(aminomethyl)cyclohexanecarboxylic acid;
amino salicylic acids;
aminobenzyl alcohol;
4-aminobutanol;
4-aminobutyric acid;
N-(4-aminobenzoyl)benzoic acid;
2-(2-aminobenzoyl)benzoic acid;
1-amino-1-cyclohexanecarboxylic acid;
4-aminocyclohexanol hydrochloride; and mixtures of such amines.

In formula (IV), $R_4$ is generally a $C_{1-20}$ alkylene or $C_{6-20}$ arylene group that contains at least one reactive moiety selected from the group consisting of amine, hydroxyl, carboxylic acid, imido, anhydride, ester, epoxy, carboxylic acid salt, or mixtures of the foregoing. Also in formula (IV), X is a leaving group capable of being displaced by a nucleophilic species, such as, for example, hydroxyl or amino. Preferably, X is a halogen, typically chlorine, or a hydroxyl group, or an alkoxy or aryloxy such as, for example, phenoxy, methoxy, or ethoxy. It is possible for formulas (III) and (IV) be connected to each other, for example, as in amino acids and derivatives of amino acids. Several illustrative examples wherein formula (III) and (IV) are present in the same compound are shown in the examples for the amine compounds. Preferred carbonyl-containing compounds include diesters, diacids, diacid chlorides, monoacid-monoesters, and monoester-monoacid chlorides represented by formula (V):

wherein Y is a divalent aliphatic containing at least 2 carbon atoms or aromatic group containing at least 6 carbon atoms, and X is as previously described for formula (IV). Illustrative carbonyl containing compounds of formula (V) include aliphatic diacids such as sebacic acid, octadecanedioic acid, suberic acid, glutaric acid, pimelic acid, and adipic acid; aromatic diacids such as the various terephthalate and isophthalate diacids and naphthalate diacids; as well as the mono- or di-acid halides and lower mono- or di-alkyl and aryl ester of all of the foregoing aliphatic and aromatic diacids. Trifunctional or multifunctional carboxylic acids may also be incorporated to make branched structures.

In a preferred embodiment, formula (III) is a lower alkylene diamine and formula (IV) is an aromatic phthalate or naphthalenedicarboxylate derivative. Preferred diamines are dimethylenediamine, trimethylenediamine, tetramethylenediamine, pentamethylenediamine, octamethylenediamine, hexamethylenediamine, trimethyl-hexamethylenediamine. Preferred aromatic phthalate and naphthalenedicarboxylate species include terephthalic acid, isophthalic acid, and 2,6-naphthalenedicarboxylic acid and lower alkyl and aryl esters, acid halides and mixed anhydrides.

The ester of formula (II) is generally derived from a reaction between
(i) compounds having at least one hydroxyl group, represented by general formula (VI):

and
(ii) compounds generally represented by formula (IV) having at least one moiety having at least one carbonyl group, or a moiety capable of forming a carbonyl group, and capable of reacting with the hydroxyl compound of formula (VI) to result in an ester or ester precursor.

In formula (VI), $R_5$ is generally a $C_{1-20}$ alkylene or $C_{6-20}$ arylene group that also contains at least one moiety selected from the group consisting of amine, hydroxyl, carboxylic acid, imido, anhydride, ester, epoxy, carboxylic acid ammonium or metal salt, or mixtures of the foregoing. As with formulas (III) and (IV), it is also possible for formulas (IV) and (VI) to be contained within the same compound. Illustrative examples include hydroxy benzoic acid, 3-hydroxybenzoic acid, 3-hydroxypicolinic acid, hydroxynicotinic acids, 4-hydroxyproline, and including caprolactone among various other lactones. The preferred hydroxy compounds include the aliphatic diols such as 1,4-butanediol, 1,2-ethanediol, 1,6-hexanediol, 1,4-cyclohexanedimethanol, 1,2-propanediol and 1,3-propanediol.

When the amine in formula (III) is a diamine, the amide of formula (I) can become a diamide comprising units represented by the general formula (VII):

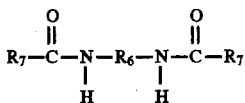 (VII)

wherein $R_6$ is a $C_{1-20}$ alkylene or $C_{6-20}$ arylene group and $R_7$ is as previously defined for $R_4$ in formula (IV).

Optionally, it is possible for the diamide or mixtures of diamides to have the formula (VIII):

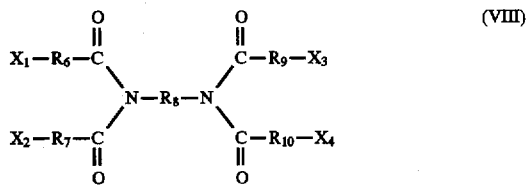 (VIII)

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from hydroxy, carboxylic acid, a lower alkyl or aryl ester of a carboxylic acid, epoxy, carboxylic acid ammonium salt or an anhydride, or hydrogen provided that at least one of $X_1$ or $X_2$ and $X_3$ or $X_4$ are not hydrogen.

In a preferred embodiment, the carbonyl species of formula (IV) is a bis-carbonyl species and the resultant amide of formula (I) comprises units represented by the general formula (IX):

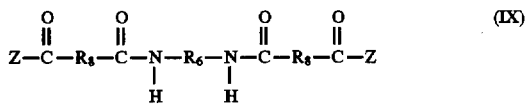 (IX)

wherein Z is either a leaving group capable of being displaced by a hydroxyl or amino group or other nucleophilic species. Preferably, Z is a halogen, typically chlorine, or a hydroxyl group, or an alkoxy or aryloxy such as, for example, phenoxy, methoxy, or ethoxy. In formula (IX), $R_6$ is as previously defined in formula (VIII), and each $R_8$ independently is generally $C_{1-20}$ alkylene, or $C_{1-20}$ arylene, or mixtures of the foregoing. Preferably $R_6$ is a 1,2-ethylene or 1,4-butylene group and each $R_8$ is para-phenylene.

When Z is an alkoxy or aryloxy group in formula (IX), the resultant formula can be referred to as a "bisester diamide" (referred to as BEDA hereinafter), e.g., a bisester diamide based on terephthalic acid or its derivative and diamine or its derivative.

For purposes of simplicity and future reference in the examples, in formula (IX) when Z is methoxy, $R_8$ is p-phenylene, and $R_6$ is tetramethylene, the resulting compound is abbreviated as T4T-dimethyl. Similarly, in formula (IX) when Z is methoxy, $R_8$ is p-phenylene, and $R_6$ is hexamethylene or ethylene, the resulting compounds are abbreviated as T6T-dimethyl and T2T-dimethyl, respectively.

PEA having a substantially uniform structure are preferable and are derived from diacid derivatives, diols and diamines. The preferred PEA contain the general formula (X):

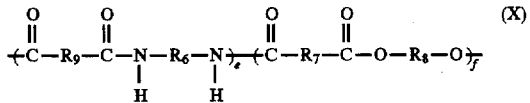 (X)

wherein $R_6$, $R_7$, $R_8$, and $R_9$ are independently $C_{1-20}$ alkylene or $C_{6-20}$ arylene and wherein e and f are each an integer greater than or equal to 1. Preferably, $R_7$ and $R_9$ are the same and are arylene, preferably a para-phenylene radical and preferably $R_6$ and $R_8$ are the same and are $C_{2-6}$ alkylene. It is preferable for e to be 1 or a mixture of 1 and higher integers wherein the fraction of said higher integers is less than about 15%, and more preferably less than about 10%. It is also possible for e and f to each be 1, in which case the resulting polymer would be a purely alternating polyesteramide. It is also preferable for the ratio of e/f to be between about 0.05 and about 1, more preferably between about 0.05 and 0.5, and for the PEA to have an inherent viscosity $[\eta_{inh}]$ exceeding 0.4 dl/g, as determined in phenol/tetrachloroethane (50:50 vol) at 25° C. using a solution of 0.5% w/v solution.

In formula (X), when $R_7$ and $R_9$ are the same, preferably para-phenylene, the polymer comprising units of formula (X) can be referred to as a Pst, wherein s refers to the number of carbon atoms in $R_8$, and t refers to the number of carbon atoms in $R_6$. For example, the PEA derived from 1,4-butanediol and tetramethylenediamine as the diol and diamine respectively would be referred to as P44 and the PEA derived from 1,2-ethanediol and tetramethylenediamine would be referred to as P24. To designate the mole percentages of diamine based on the total of diol and diamine, the mole percentage of diamine is commonly designated as Pst-%. According to this nomenclature scheme, a PEA derived from tetramethylenediamine and 1,2-ethanediol wherein the tetramethylenediamine is at a level of 20 mole percent, would be referred to as P24-20.

The term "uniformity" or the "degree of uniformity" as it refers to the structure of the PEA indicates the molar fraction of units with e=1 relative to the sum of the units with e=1,2,3,4 . . . Units with e=1 and e=2, etc. can be discerned by NMR. So:

$$\text{Degree of Uniformity} = \frac{(\text{units with } e=1)}{(\text{units with } e=1) + (\text{units with } e=2) + (\text{units with } e=3) + \text{etc.}}$$

Although it is possible to employ PEA having either block or random structure, it is especially preferred that the PEA have a substantially uniform structure. By substantially uniform structure, it is meant that the degree of uniformity is high, e.g., greater than about 0.70 preferably greater than 0.85 and most preferably greater than 0.90. By having a substantially uniform structure, the blends of PEA and poly(phenylene ether) resins have surprisingly high Vicat softening temperatures and high crystallization rates. As the PEA having substantially uniform structure are the most preferred, the remaining description will focus on these materials, it being understood that normal PEA with random and block structures are also contemplated.

It has been found that blends of PEA built up from units preferably originating from terephthalic acid, 1,4-butanediol and 1,4 butanediamine (i.e., a P44 resin) have exceptionally good properties. For example, the Vicat temperature of the poly(phenylene ether) ("PPE")/PEA blends is significantly better than the corresponding PPE/polybutylene terephthalate ("PBT") blends. Other beneficial properties which should be obtained by the blends of the present invention include increased crystallization rate, decreased water absorption, increased paint adhesion to the blend, better chemical resistance, an increase in flow for a given glass transition of the blend, and a decrease in the degree of transesterification. The improvements in these properties are compared to the corresponding blends of PPE/PBT, i.e., blends of PPE/PBT with similar weight ratios of PPE to PBT as the ratios of PPE to PEA.

Applicants have also discovered that most of the above properties are even better when a PEA having a uniform structure is employed. For example, Applicants have discovered that increasing the degree of uniformity on the PEA has a positive effect on the Tm and the crystallization rate of PEA resins and also on the properties of PEA in the blend with poly(phenylene ether) resin. Another surprising advantage of a highly uniform PEA is a low amino end group content in PEA originating from amide block impurities in BEDA. For that reason the number of repeat units of formula 7, i.e. units originating from diamine, which is present next to each other in the copolyester amide (e>1), is preferably not more than 15% of the overall number of e-units of formula (IX).

As mentioned above, the viscosity of the PEA, i.e. the measure for the molecular weight $[\eta_{inh}]$, preferably exceeds 0.4 dl/g, and more preferably exceeds 0.6 dl/g. The viscosity has been determined in phenol/tetrachloroethane (50/50 (vol)) at 25° C. using a 0.5% weight/volume solution. These viscosities have been determined to provide a good mix of mechanical properties which are particularly desirable for the finished blend; e.g., both the elongation at break, and the impact strength are good when the viscosity exceeds about 0.4 dl/g. There is, however, no special advantage for increasing the viscosity beyond about 5.0 dl/g. Rather, when the viscosity exceeds about 5.0 dl/g, very special conditions have to be used for processing the material. Consequently, viscosities above about 5.0 dl/g are not preferred.

The PEA according to the invention are particularly well suited for blending with poly(phenylene ether) resins because they have a number of unexpected and special properties. First of all, the melting temperature of the blend has been increased with respect to the melting temperature of the corresponding blend with polyesters, i.e. PBT. This is particularly surprising, since on the basis of prior art data, it might be expected that it would have been lower. The variation of the modulus at temperatures above the glass transition temperature is also surprisingly favorable. In fact the modulus shows a considerably smaller decline than is usual, so that the temperature range within which the products according to the invention are useful, is much larger.

As a result, new possibilities are opened for a great number of new applications. The blends of PPE/PEA according to the invention constitute a class of polymers having a wide range of applications due to the rapid crystallization and extent of ordering in the solid state. The resistance to solvents is particularly good, and the water absorption is very low. The PEA according to the invention may also be used inter alia as an "engineering plastic" for blending with PPE. As such, it is also possible to manufacture the PEA with a "random" distribution of the units e and f. However, a considerably better combination of properties is obtained when the degree of uniformity is high.

The major components of the PEA according to the invention originate from 1,4-butanediamine, 1,4-butanediol, and terephthalic acid. However, it is also possible to replace a minor quantity of these components by other corresponding components. It is preferred, however, that these other components not adversely influence the properties of the PEA. For this reason, usually not more than 10 mol. % of each component should be replaced by another component. This quantity is preferably not more than about 5 mol. %, and most preferably about 0%.

The preparation of the PEA according to the invention may be carried out in various manners. According to a first embodiment, it is done in a number of steps. A bisester diamide is prepared in a first step by reaction of a diamine with at least a two fold molar quantity of a diester of terephthalic acid, for example, dimethyl terephthalate. This reaction is generally carried out in the presence of a catalyst, for example, Li(OCH$_3$). The use of a catalyst is not necessary, but in general has a positive influence on the course of the reaction. If the reaction is carried out starting from a mixture of all components which are provided in the reactor prior to the beginning of the reaction, a rather large excess of diester (about 400%) should be used so as to obtain an optimum product. It has surprisingly been found that it is also possible to prepare the product with a high yield using a small excess of diester (about 150%). It is also possible to start from the diamine and p-carboalkoxyl-benzoyl chloride.

A mixture of the bisester diamide, a diol and optionally terephthalic acid, or terephthalic acid derivative, is then condensed to form a prepolymer. This prepolymer may finally be postcondensed to form a PEA having the desired properties.

The conditions for the preparation of PEA known in the literature may be used for the prepolymerization, but it is preferred to perform the prepolymerization at a temperature less than about 260° C., at a low pressure, preferably less than about 1 mm Hg, for at least about 20 minutes and preferably of least about 40 minutes. This second phase may be carried out at a temperature between about 230° and about 300° C., at low pressure, preferably less than about 1 mm Hg., for at least about 30 minutes, and then at a temperature of less than about 230° C. at a pressure of less than about 5 bar, for about 45 to about 120 minutes.

The prepolymer thus obtained may optionally be postcondensed in the conventional manner in the solid state at a temperature between about 175° C. and a few degrees below the melting point of the polymer, in the presence of an inert gas or under vacuum or under vacuum with a stream of inert gas.

Another method of preparing the PEA according to the invention comprises adding together a diol, a diamine, and a dialkyl terephthalate, terephthalic acid, or a terephthalate derivative, followed by increasing the temperature of the mixture to a value between about 150° C. and about 200° C. When the boiling temperature of the diamine is below about 150°–200° C., it is preferred to close the reactor, apply a prepressure or recycle the diamine. In this manner a prepolymer having a reasonable degree of order is obtained, which prepolymer may be postcondensed to the desired molecular weight. An advantage of this method is that it can be carried out in one reactor without intermediate isolation and/or purification steps, which may have important practical advantages.

Yet another method that may be employed involves bringing together a mixture of the diol and the diester at the indicated reaction temperature and then gradually adding the diamine. In this manner the advantage of a one-reactor method is still present, while an excellent product is obtained.

By varying the ratio of diester, diol and terephthalic acid derivative, PEA may be obtained with various ratios between ester and amide groups.

In the above description, terephthalic acid or a derivative thereof is used as a starting material for the preparation of the copolyester amide. This includes, in principle, any terephthalic acid derivative which may be used for this purpose, notably the diesters of terephthalic acid having a splittable ester group, for example, a lower alkyl group ($C_1$–$C_4$). In this regard, it is noted that it is also possible to start from a dicarboxylic acid other than terephthalic acid, for example, 2,6-naphthalenedicarboxylic acid, provided that the dicarboxylic acid has the same or similar structural properties in the PEA according to the invention as terephthalic acid.

To the extent that the uniform or ordered structure on the polyesteramide is not desired or necessary, it is also possible to prepare the polyesteramide according to the process set forth in U.S. Pat. No. 2,856,385.

The poly(phenylene ether) resins employed in the present invention are known polymers comprising a plurality of structural units of the formula (XI):

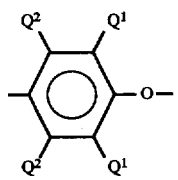

(XI)

wherein each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

For one embodiment of the present invention, it is essential for the thermoplastic resin blend to contain at least one compatibilizer for the PPE and the PEA. Useful compatibilizers include PPE which contain at least one reactive functional group capable of reacting with the PEA. Useful functional groups for the compatibilizers include, for example, the following reactive groups: oxazoline, orthoester, carboxylic acid, carboxylic acid derivatives, and/or epoxy. The compatibilizer may also contain more than one reactive group provided that the reactive groups are not reactive with one another. The functional group may be present on a PPE polymer endgroup or along the backbone of the PPE polymer chain. These PPE which contain at least one reactive functional group are generally referred to as compatibilizing PPE or functionalized PPE. The functional groups may also be present on a separate molecule which serves the role or function of the compatibilizer.

As previously mentioned, one type of useful reactive functional group for the compatibilizer is epoxy. A useful method for preparing an epoxy functionalized PPE involves reacting PPE with an unsaturated epoxy species such as, for example, glycidyl acrylate and glycidyl methacrylate. Methods to prepare epoxy functionalized PPE from unsaturated epoxy species can be found in U.S. Pat. Nos. 4,994,531 and 5,214,099, both of which are incorporated herein by reference. A useful method for preparing an appropriate epoxy-type compatibilizing PPE involves reacting PPE with various epoxy chlorotriazine compounds in a non-reactive solvent for PPE. The capped PPE may be isolated by conventional techniques, such as precipitation with a non-solvent. Non-limiting examples of these compounds include 2-chloro-4,6-diglycidoxy-1,3,5-triazine; 2-chloro-4-(n-butoxy)-6-glycidoxy-1,3,5-triazine; and 2-chloro-4-(2,4,6-trimethylphenoxy)-6-glycidoxy-1,3,5-triazine, also known as mesityl glycidyl chlorocyanurate (MGCC.). Methods to prepare these compounds and functionalized PPE resins can be found in U.S. Pat. Nos. 4,895,945; 5,041,504; 5,089,566; 5,096,979; and 5,132,373 all of which are incorporated herein by reference.

Another PPE useful as a compatibilizer for the present invention is orthoester functional PPE. The term "orthoester" is meant to refer to a compound in which one carbon atom is attached to another by a direct carbon—carbon bond, and to three further carbon atoms through oxygen. Such compounds can be considered to be esters of the hypothetical orthoacids R—C(OH)$_3$, wherein R is an organic radical. The existence of such orthoacids is for the most part unknown, since they immediately dehydrate to conventional carboxylic acids. However, esters of such acids are known and the compositions of this invention include certain polymer substituted esters of this type.

The orthoester functional PPE preferably contain orthoester moieties represented by the formula (XII):

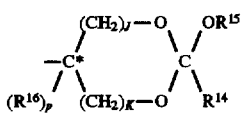 (XII)

wherein $R^{15}$ is a $C_{1-4}$ primary or secondary alkyl radical or is an alkylene radical forming a second 5- or 6-member ring with $C^*$; $R^{14}$ is a $C_{1-4}$ primary or secondary alkyl or $C_{6-10}$ aromatic radical, or $R^{14}$ and $R^{15}$ together with the atoms connecting them form a 5-, 6- or 7-member ring; $R^{16}$ is hydrogen or $C_{1-4}$ primary or secondary alkyl; K is 0 or 1; J is from 1 to 2-K; and p is 0 when $R^{15}$ and $C^*$ form a ring and is otherwise 1.

The $R^{15}$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred. It is also possible for $R^{15}$ to form a second 5- or 6-member ring with other portions of the molecule. For this purpose, one of the carbon atoms in the orthoester ring is designated $C^*$ to indicate its role as part of said second ring.

The $R^{14}$ value may be a $C_{1-4}$ primary or secondary alkyl radical as defined above for $R^{15}$ or a $C_{6-10}$ aromatic (preferably aromatic hydrocarbon) radical.

Finally, it is possible for $R^{14}$ and $R^{15}$ together to form a 5-, 6- or 7-member ring with the atoms connecting them. The $R^{16}$ radical may be hydrogen or an alkyl radical similar to $R^{14}$ and $R^{15}$. It is preferably hydrogen.

The values of J and K depend on whether the cyclic orthoester moiety is a 5-member or 6-member ring. In general, 5-member rings are preferred; that is, K is 0 and J is 1. However, the invention also includes compositions in which a 6-member ring is present, which requires either that J and K both be 1 or that K be 0 and J be 2.

The value of the subscript p also depends on the cyclic structure of the orthoester moiety. If $C^*$ is part of a ring structure with $R^{15}$, all four valences thereof are satisfied and p will be 0. If this is not the case, p will be 1.

The following is an illustrative orthoester moiety (XIII) which may be present in the orthoester functional PPE:

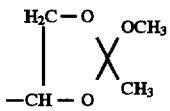 (XIII)

and which may also be referred to as a 4-(2-methoxy-2-methyl-1,3-dioxolanyl) radical and is usually preferred. Intermediates for preparation of such compounds include 4-hydroxymethyl-2- methoxy-2-methyl-1,3-dioxolane, which is obtainable by the reaction of glycerol and methyl orthoacetate. An improved method for the preparation of this and structurally related compounds in substantially pure form and the products thus obtained are disclosed in U.S. Pat. No. 5,231,197, which is incorporated herein by reference.

The PPE having orthoester functional moieties are preferably prepared by melt extrusion of PPE with at least one graftable ethylenically unsaturated orthoester monomer. The functional orthoester monomer may be represented by the general formula (XIV):

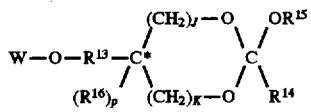 (XIV)

wherein the $R^{14}$, $R^{15}$, $R^{16}$, Z, J, K, p and $C^*$ are as previously defined, $R^{13}$ is a $C_{1-6}$ alkylene radical and W is a graftable unsaturated group represented by the following formula (XV)

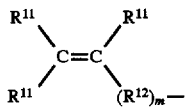 (XV)

wherein each $R^{11}$ may independently be hydrogen, or a $C_{1-8}$ radical, or substituted derivatives thereof; or an aryl radical, or substituted derivative thereof. Each $R^{11}$ can also be other groups, provided that the group is inert to the orthoester. The value of m may be 1 or greater. $R^{12}$ can be one of the following formulae (XVI):

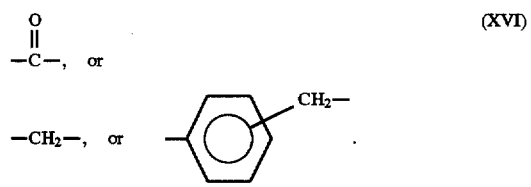 (XVI)

Illustrative examples of monomers which may be employed in the present invention include 4-acryloyloxymethyl-2-methoxy-2-methyl-1,3-dioxolane, 4-methacryloyloxymethyl-2-methoxy-2-methyl-1,3-dioxolane, 4-acryloyloxymethyl-2-methoxy-2-phenyl-1,3-dioxolane and the isomeric mixture of 4-(2-methoxy-2-methyl-1,3-dioxolanyl)methyl vinylbenzyl ethers. Methods for the preparation of these materials and their reaction with PPE can be found in U.S. Pat. Nos. 5,171,866, 5,153,290 and 5,212,255, which are incorporated herein by reference.

Preferably the vinyl functional orthoester monomer is of the formula (XVII):

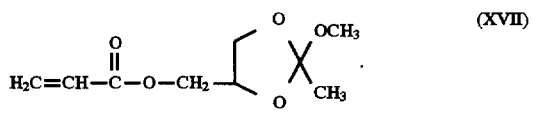 (XVII)

Another preferred vinyl functional orthoester monomer is represented by the formula (XVIII):

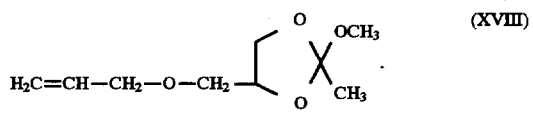 (XVIII)

It is sometimes advantageous to use an initiator in the preparation of the functionalized PPE with the functionalizer compound. Suitable initiators for use in the current invention include free radical initiators generally known to the art. Specific initiators include various peroxides and hydroperoxides. Specific examples include benzoyl peroxide, dicumyl peroxide, 2,5-dimethyl-2,5-di(t-butylperoxy) hexyne-3 and cumene peroxide, with 2,5,-dimethyl-2,5-di (t-butylperoxy)hexyne-3 being preferred. When it is used, the amount of initiator used can vary from about 0.05 weight percent to about 0.5 weight percent relative to the weight of the PPE.

Orthoester derivatives of chlorotriazine compounds, as previously noted for epoxy groups, are also useful including 2-chloro-4-(2-methoxy-2-methyl-1,3-dioxolanyl)methoxy-6-phenoxy-1,3,5-triazine, for example. References to prepare appropriate triazine compounds can be found in U.S. Pat. No. 5,132,373, which is incorporated herein by reference.

The amount of the functionalizing agent that is required to appropriately functionalize the PPE is that which is sufficient to improve the compatibility between the various components in the composition. Compatibility is meant to include the stabilization of gross phase separation between the components of the blend. Indicators of improved compatibilization include, for example, increased tensile properties, reduced lamination tendency, increased ductility and improved phase morphology stabilization. It is through the effect of improving the compatibility of the blend components which determines, in part, the desirable physical properties of the blend. An effective amount of the functionalizing agent, based on the amount of the PPE, is generally up to about 8% by weight, and is preferably from about 0.05% to about 4% by weight. In the most preferred embodiments, the amount of the functionalizing agent is generally in the range from about 0.1% to about 3% by weight based on the weight of the PPE. The amount of functionalizing agent required may sometimes vary outside the weight ranges described herein depending on a variety of variables, such as the molecular weight of the functionalizing agent and the efficiency of the functionalizing agent to compatibilize the blend components. An exact amount can be readily determined by one of ordinary skill in the art without undue additional experimentation based on the degree of compatibilization which is desired.

It is also sometimes advantageous to employ at least one lubricant which is substantially inert to the functionalizing agent and other ingredients in the preparation of a functionalized PPE. The presence of the lubricant decreases the required melt processing temperature to produce the functionalized PPE, as well as the compatibilized blends prepared therefrom. As a result, gel formation is minimized.

Suitable lubricants will be apparent to those skilled in the art; in general, they are solids with high lubricity or relatively low melting solids or oils. Examples include polytetrafluoroethylene, fatty acid amides as disclosed and claimed in commonly owned application Ser. No. 07/815211 (abandoned), aluminum alkylphosphonates as disclosed and claimed in commonly owned U.S. Pat. No. 5,376,714, and hydrogenated poly(alpha-olefins) as disclosed and claimed in, commonly owned application Ser. No. 07/816430 (abandoned) and commonly owned U.S. Pat. Nos. 5,214,099 and 5,281,667, which are incorporated herein by reference.

The hydrogenated poly(alpha-olefins) are often preferred. They may be obtained by the catalytic polymerization of alpha-olefins followed by hydrogenation to remove residual unsaturation. The catalysts which may be employed in their preparation include cationic and metathetic catalysts. Methods for preparing hydrogenated poly(alpha-olefins) are disclosed, for example, in U.S. Pat. Nos. 4,225,739, 4,282,392, 4,311,864, 4,319,065, 4,334,113 and 4,409,415, all of which are incorporated herein by reference. The products comprise polymers of various molecular weights, including oligomers.

The most preferred hydrogenated poly(alpha-olefins) are those having kinematic viscosities of about 2–20 centistokes and especially 8–12 centistokes at 100° C., as determined by ASTM procedure D445. They are commercially available from such companies as Henkel Corporation under the tradename EMERY fluids.

The hydrogenated poly(alpha-olefins) are generally used in a lubricating amount. The lubricating amount, based on the weight of the PPE, is generally in the range of about 1% to about 5% by weight and preferably about 2% to about 4% by weight.

The invention also includes compositions containing elastomeric impact modifiers compatible with either or both the PPE and the PEA.

Impact modifiers for PPE and PEA are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof. The impact modifier may be functionalized or may not be functionalized.

Olefin polymers and copolymers employable in the invention include low density polyethylene (LDPE), high density polyethylene (HDPE), linear low density polyethylene (LLDPE), isotactic polypropylene, poly(1-butene), poly(4-methyl-1-pentene), and the like. Additional olefin copolymers include copolymers of one or more alpha-olefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

One type of olefinic elastomer useful in the present invention are copolymers of an alpha-olefin with a glycidyl ester of an alpha,beta-unsaturated carboxylic acid. Alpha-Olefin as used herein means ethylene, propylene, butene-1, etc. Among them, ethylene is preferred. The glycidyl esters of the alpha,beta-unsaturated acids are compounds of the general formula (XIX):

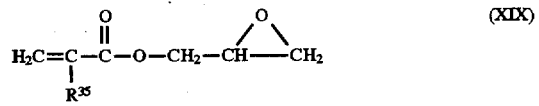

wherein $R^{35}$ represents a hydrogen atom or a lower alkyl group. Examples of the glycidyl esters of alpha,beta-unsaturated acids include glycidyl acrylate, glycidyl methacrylate and glycidyl methacrylate. The epoxy functional olefinic elastomer is preferably an olefinic copolymer containing from about 60% to about 99.5% by weight of an alpha-olefin and from about 0.5% to about 40% by weight of a glycidyl ester of an alpha,beta-unsaturated carboxylic acid, preferably from about 3% to about 30% by weight; based on the weight of the elastomer's composition. When this amount is less than about 0.5% by weight, no intended effects can be obtained and when it exceeds about 40% by weight, gelation occurs during melt-blending resulting in degradation of the extrusion stability, moldability and mechanical properties of the product. Suitable epoxy functional alpha-olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional elastomers are available from Sumitomo Chemical Co. under the trademarks IGETABOND and BONDFAST and from Elf Atochem under the trademark LOTADER.

A particularly useful class of impact modifiers are those derived from the vinyl aromatic monomers. These include AB and ABA type block, tapered and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Patent 1,264,741, all incorporated herein by reference. Examples of typical species of AB block copolymers include, e.g., polystyrene-polybutadiene (SBR), polystyrene-poly(ethylenepropylene) (S-EP), polystyrene-polyisoprene and poly(alpha-methylstyrene)-polybutadiene. Such AB block copolymers are available commercially from a number of sources, including Phillips Petroleum under the trademark SOLPRENE, from the Shell Chemical Co. under the trademark KRATON, and from Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include polystyrene-polybutadiene-polystyrene (SBS), polystyrene-poly (ethylenebutylene)-polystyrene (SEBS), polystyrene-polyisoprene-polystyrene (SIS), poly(alpha-methyl-styrene)-polybutadiene-poly(alpha-methylstyrene) and poly(alpha-methylstyrene)-polyisoprene-poly(alpha-methylstyrene). Particularly preferred triblock copolymers are available commercially from Shell Chemical Co. under the trademarks CARIFLEX and KRATON.

Another class of useful impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. They may also contain reactive groups such as acid, oxazoline, ortho-ester, epoxy, amine, or anhydride. Many EPDM's and processes for the production thereof are disclosed in U.S. Pat. Nos. 2,933,480, 3,000,866, 3,407,158, 3,093,621 and 3,379,701, which are all incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The shells of these impact modifiers may also contain reactive groups, for example, acid, epoxy, oxazoline, ortho-ester, amine, or anhydride groups. The core-shell copolymers are widely available commercially in pellet and powder forms, for example, from Rohm and Haas Company as grades including EXL-3330, EXL-3691, EXL-2600, EXL-2607, EXL-2647, EXL-3386, and EXL-3607, and are described in U.S. Pat. Nos. 3,808,180, 4,034,013, 4,096,202, 4,180,494 and 4,292,233.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, silicone rubbers, thermoplastic polyester elastomers and thermoplastic poly(ether-ester) and poly(ester-amide) elastomers.

The proportion of impact modifier or other resinous material is subject to wide variation. The amount of impact modifier used is generally an amount sufficient to improve the ductility of the compositions. Improved ductility is generally indicated by enhanced impact properties such as notched Izod or falling dart impact or increased tensile elongation properties. Impact modifiers, when utilized, are usually present in an amount up to about 20 percent by weight based on the total weight of the composition.

The addition of reinforcing fillers is also contemplated for the compositions of the present invention. Suitable reinforcing fillers are those which increase the rigidity of the blend composition. Amongst these, fibrous materials are preferred, in particular glass fibers made from low alkali E-glass, having a fiber diameter from about 8 µm to about 20 µm. The length of the glass fibers in the finished molded part is typically, for example, from about 0.01 mm to about 5 mm. The glass fibers may be employed as rovings or as chopped or milled glass fibers, and may be provided with a suitable finish and an adhesion promoter or promoter system based on silanes. The amount of reinforcing fillers is advantageously from about 5 weight percent to about 60 weight percent, especially from about 10 weight percent to about 40 weight percent based on the total weight of the composition.

Other fibrous reinforcing materials, e.g. carbon fibers, potassium titanate single-crystal fibers, wollastonite, gypsum fibers, aluminum oxide fibers or asbestos may also be utilized. Non-fibrous fillers, e.g. glass beads, hollow glass beads, talcs, micas, chalks, quartzes and natural or calcined kaolins are further preferred fillers, as are combinations of these materials with glass fibers. Like the glass fibers, these latter fillers may be provided with a finish and/or an adhesion promoter or adhesion promoter system. The combination of a non-fibrous filler that also has a platey structure, e.g. talcs, micas and platey kaolins, with glass fibers is especially preferred for some applications to reduce the anisotropic properties of the final composition due to alignment of the glass fiber with the direction of the mold filling during processing. The amount of non-fibrous filler can range from 0% to about 50% by weight based on the total weight of the entire composition.

The compositions of the present invention may also contain at least one polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (XX):

(XX)

wherein $R^{45}$ is hydrogen, lower alkyl or halogen; Y is hydrogen, vinyl, halogen or lower alkyl; and f is from 0 to 5. These resins include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes comprising blends and grafts, wherein the rubber is a polybutadiene or a rubbery copolymer of about 98–65% styrene and about 2–35% diene monomer. These rubber modified polystyrenes include high impact polystyrene (commonly referred to as HIPS). Non-elastomeric block copolymer compositions of styrene and butadiene can also be used that have linear block, radial block and tapered block copolymer architectures. They are commercially available from such companies as Fina Oil under the trademark FINACLEAR resins and from Phillips Engineering Resins under the trademark K-RESINS.

The alkenylaromatic compound when present is generally used in the range from about 1% to about 25% by weight and preferably from about 5% to about 15% by weight; based on the weight of the total composition.

The present invention also contemplates the use of effective amounts of at least one additive selected from the group consisting of flame retardants, drip retardants, dyes, pigments, colorants, stabilizers, antistatic agents, nucleating agents, plasticizers and lubricants. These additives are known in the art as are their effective levels and methods of incorporation. Effective amounts of the additives vary widely, but they are usually present in an amount from about 0.1% to 50% by weight, based on the weight of the entire composition.

It was also surprisingly found that a compatibilizing PPE could be diluted with non-functionalized PPE to adjust the viscosity of the blend composition with the PEA. This discovery allows for a master batch of functionalized PPE to be prepared and admixed with non-functionalized PPE and compatibilizer compound and PEA, in addition to other ingredients, to make a family of similar compositions having a range of viscosities made from common starting materials to meet a variety of end-use requirements for the final compositions.

The ratio of compatibilizing PPE or mixture of compatibilizing PPE with unfunctionalized PPE to PEA can vary from about 99:1 to 1:99, depending on the various property requirements that the composition must meet. The resulting compositions may exhibit either a matrix phase of PPE having PEA particles dispersed therein or a matrix of PEA having PPE particles dispersed therein. For compositions having a continuous phase of PEA, the preferred ranges are generally from about 1–60% by weight of the compatibilizing PPE or mixture of compatibilizing PPE with non-functionalized PPE, and about 99–40% by weight of the PEA. The most preferred range is generally from about 10–40% by weight of compatibilizing PPE or mixture of nucleophile containing PPE with non-functionalized PPE and about 90–60% by weight of the PEA. The preferred range of the compatibilizing PPE to non-functionalized PPE generally depends, among other factors, on the number of reactive species per molecule of compatibilizer compound used to make the compatibilizing PPE, the reactivity between the reactive groups on the PPE and the reactive groups on the PEA and the degree of compatibilization that is desired between the various components. For compositions having a continuous phase of the PPE, the ratios of PPE and PEA given above can be inverted. One of ordinary skill in the art will be able to optimize the amount components required based on the intended physical properties desired without undue additional experimentation.

PPE/PEA blends of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in melt compounding methods include: co-rotating and counter-rotating extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with one of the primary polymer components, PPE and polyesteramide copolymers. It appears that certain properties, such as impact strength and elongation, are sometimes enhanced by initially precompounding the PPE and/or polyesteramide with at least one of the typical additives identified above. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

The blends accordingly to the present invention provide a number of advantageous properties over the corresponding blends of poly(phenylene ether) (PPE) and polyester. By corresponding polyester is meant the PEA absent the amide moieties (e.g., the corresponding polyester for P44 is polybutylene terephthalate (PBT)). For example, improved heat resistance, as determined by heat sag, is evident for PEA/PPE blends when compared to PBT/PPE blends of the same composition.

It should also be clear that improved molded articles prepared from the compositions of the present invention represent an additional embodiment of this invention.

The thermoplastic compositions may be molded into articles which exhibit desired levels of toughness, chemical resistance and flash resistance. Specifically, the thermoplastic compositions are useful in making automotive parts for under the hood applications, needing both solvent resistance and high heat distortion temperatures.

All patents and references cited herein are incorporated by reference.

The following examples are provided to illustrate some embodiments of the present invention. They are not intended to limit the invention in any aspect. All percentages are by weight based on the total weight of the entire composition, unless otherwise indicated.

EXAMPLES

Example 1

1. Polybutylene terephthalate (PBT)

The preparation of PBT was accomplished in a 1.3 liter stainless steel reactor equipped with a nitrogen gas inlet, mechanical stirrer, and vacuum source. The reactor was charged with 200 g DMT (1.03 Moles), 186 g BDO (2.06 Moles) and 3.75 mL $Ti(OC_3H_7)_4$ (0.175 Moles) and rapidly heated to 160° C. followed by heating at 1.5° C./min to 255° C. At about 255° C. the pressure was gradually reduced (over 15 min) to 15–20 mBar and further reduced to 0.1–0.4 mBar (over 60 min). The polymer was removed after cooling and breaking the vacuum. The polymer's melting temperature was 222° C., crystallization temperature 186° C., and η$_{inh}$ was 1.39 dl/g measured as 0.5 g/dl solution in phenol/tetrachloroethane (50:50 vol) at 25° C., corresponding to a molecular weight of 93000.

2. T4T-dimethyl

A 1 L glass reactor equipped with Dean-Stark trap, reflux cooler, stirrer and nitrogen inlet was charged with 88 g dimethylterephthalate, 210 mL DMF and 210 mL toluene. The reactor was heated under nitrogen to about 140° C. and 8 g 1,4-diaminobutane and 0.65 g LiOCH$_3$ were added. The solution was stirred for about 4 hours at about 140° C. during which a precipitate formed. The precipitate was hot-filtered, washed with hot toluene and hot methanol. The washed precipitate was dried at about 175° C. for approximately 1 hour. The yield was 82%.

3. T2T-dimethyl

The same procedure as used for T4T-dimethyl was applied with the exception that the 1,4-diaminobutane was replaced by 1,2-diaminoethane, and 0.95 g LiOCH$_3$ were used. The yield was 72% and the melting point was 295° C.

4. T6T-dimethyl

The same procedure used for T2T-dimethyl was applied with the exception that the 1,2-diaminoethane was replaced by 1,6-diaminohexane. The yield was 79% and the melting point was 234° C.

5. T4T-dimethyl purity

T4T-dimethyl can be considered to contain 1.5 repeat unit of polyamide 4,T. With the procedure used for T4T-dimethyl, inevitably some material with 2.5 (e.g., T4T4T-dimethyl) and 3.5 repeat units is possibly made, which in a P44-copolymer leads to segments with e=2, 3, etc. Due to precipitation during the reaction, the fraction of oligomers higher than T4T4T-dimethyl is not generally large. With 13-C NMR it is possible to quantify 4T4 sequences, and by that the purity of the product with respect to T4T-dimethyl content of the product. By varying the toluene/DM ratios in the procedure used for T4T-dimethyl various T4T-dimethyl purity levels and yields can be obtained. Data illustrating the effects of toluene/DMF ratios on yield and T4T-dimethyl is provided in Table 1a. As seen with the data, a high toluene/DMF ratio leads to high purity T4T-dimethyl although at a lower over conversion.

TABLE 1a

| Toluene (mL) | DMF (mL) | Yield (%) | T4T-dimethyl (%) |
| --- | --- | --- | --- |
| 370 | 50 | 66 | 96 |
| 100 | 120 | 81 | 92 |
| 210 | 210 | 82 | 85 |

6. Lithium alcoholates for the T4T-dimethyl synthesis

Lithium alcoholate catalyst was synthesized by reaction of LiH or metallic lithium with an alcohol in toluene solution. With this method several catalysts were prepared and their activities were tested in the bisester diamides reactions. The examples confirmed that any linear aliphatic alcohol, or diol having preferably high boiling points or electron donating groups, e.g. dimethylamino-propanol and other related alcohols, were able to form active catalysts for the synthesis of the T4T-dimethyl. Table 1b below indicates the obtained yields with the minimum catalyst content:

TABLE 1b

| Compound | Amount (mmol) | Yield (%) |
| --- | --- | --- |
| Li-diethylaminoethanol | 2 | 66 |
| Li-dimethylaminoethanol | 6.5 | 80 |
| Li-Octanolate | 0.9 | 80 |
| Li-Hexanolate | 2.5 | 80 |
| Li-Butanolate | 7.5 | 60 |
| Li-Methanolate | 19 | 85 |

7. P44-5 from preformed T4T-dimethyl.

To a 1 l glass reactor equipped with Dean-Stark trap, condenser, stirrer, nitrogen inlet and vacuum port was charged 337 g dimethylterephthalate (1.735 Moles), 37 g T4T-dimethyl (0.089 Moles) and 263 g 1,4-butanediol (2.684 moles, BDO). The contents were heated to 165° C. and allowed to dissolve with continuous stirring. Following the addition of 0.46 cc Ti(OC$_4$H$_9$)$_4$ methanol was distilled from the reactor. The temperature was increased to about 235° C. over 30 min. After collection of about 160 mL of distillate, the Dean-Stark trap and condenser were replaced by a vacuum-line with cold trap. A vacuum was applied gradually to reduce the pressure to about 5 mm Hg. After the viscosity began to rise, the temperature was increased to 250° C. and the pressure reduced to about 0.1 mm Hg. The polymerization was discontinued when the melt started to wrap itself around the stirrer. The melting temperature of the polymer, determined as the peak-maximum of the second heating scan in DSC (20° C./min), was 226° C. The crystallization temperature, obtained from the consecutive cooling scan (20° C./min) was 190° C. Molecular weight, determined by GPC at 40° C. in m-cresol/chloroform (10/90), was 93.000, referenced to PS-calibration standards.

8. P44-10 from preformed T4T-dimethyl

A procedure analogous to that for P44-5 was used, starting with 300 g DMT, 74 g T4T-dimethyl and 263 g BDO. The resulting polymer had a melting temperature of 231° C., a crystallization temperature of 190° C. and a molecular weight (GPC) of 81000.

9. P44-15 from preformed T4T-dimethyl

A procedure analogous to that for P44-5 was used to prepare P44-15, which had melting temperature of 239° C., a crystallization temperature of 219° C. and a molecular weight of 71000.

10. P44-20 from preformed T4T-dimethyl

A procedure analogous to that for P44-5 was used, starting from 226 g DMT, 148 g T4T-dimethyl and 263 g BDO. The final polymerization temperature had to be increased to about 260° C. due to the higher melting temperature of the final copolymer, which was 252° C. Its crystallization temperature was 222° C. and its molecular weight 34000. Postcondensation during 24 hours at about 240° C. in nitrogen resulted in a molecular weight of 70000.

P44-10, P44-20 and P44-25 were also prepared using an analogously procedure for the preparation of PBT. For example, in the case of P44-20, 100 g T4T-dimethyl (0.242 mol), 142 g DMT (0.729 mol) and 217 g BDO (2.43 mol) were dissolved at about 180° C. After addition of 3.75 mL Ti(OC$_3$H$_7$)$_4$ (0.175 M), the mixture was transesterified during 30 min at 180° C. and then heated at about 15° C. per 10 min to about 255° C. (265° C. for P44-25). At 255° C., the pressure was gradually reduced (over 15 min to about 15–20 mBar and over an additional 15 min to about 0.1–0.4 m bar). The prepolymers were still brittle and easy to pulverize for further solid state polymerization. The P44-10, P44-20 and P44-25 were solid state polymerized at about 15° C. below their melting temperature (Tm 2 in Table 1c)

under vacuum (about 0.1–0.4 m bar). The inherent viscosity increased indicated as $\eta_{inh}$ (initial) and $\eta_{inh}$-A (final). The results of these experiments are summarized in Table 1c below:

TABLE 1c

| Polymer | $\eta_{inh}$ [dl/g] | $\eta_{inh}^{-A}$ [dl/g] | Tm-2 [°C.] | Tc [°C.] | uniformity [mol %] | NH2 [µeq/g] | COOH [µeq/g] |
|---|---|---|---|---|---|---|---|
| PBT-c | 1.39 | — | 222 | 186 | — | 0 | 25 |
| P44-10 | 0.47 | 2.12 | 229 | 192 | >97 | 12 | 38 |
| P44-20 | 0.58 | 1.08 | 254 | 221 | 93 | 32 | 43 |
| P44-25 | 0.39 | >0.81 | 256 | 232 | 84 | 37 | 97 |

The inherent viscosities were mesured in phenol/tetracholoroethane (50:50 mol) at 25° C., 0.5 g/dl solution. The melting temperature Tm-2 and crystallization temperature Tc were determined from the peak maximum during the second heating scan and the cooling scan respectively in a DSC (20° C./min). The uniformity of the amide unit was determined by $^{13}$C-NMR in trifluoroacetic acid (TFA-d). The amino (NH$_2$) and carboxylic acid (COOH) endgroup content were determined by titration.

11. P46-10 from preformed T6T-dimethyl

A procedure analogous to that for P44-5 was used, starting from 300 g DMT, 74 g T6T-dimethyl, prepared according to procedure 4, and 263 g BDO. The resulting polymer had a melting point of 213° C., a crystallization temperature of 178° C. and a molecular weight of 84000.

12. P44-5 from in situ made T4T-dimethyl

To a 2 l oil heated stainless steel reactor, equipped with a mechanical stirrer, torque measurement device, Dean-Stark trap, condenser, and nitrogen inlet was charged 790 g DMT and 17.9 g dry 1,4-diaminobutane and heated to about 175° C. Shortly after the mixture had become molten and transparent (visible through a glass insert) a very fine precipitate formed, and methanol distilled off. The reaction was continued for about 1 hour, after which 557 g BDO and 1.1 g Ti(OC$_4$H$_9$)$_4$ were added. The temperature was readjusted to about 165° C. and kept there for about 20 min. Methanol, followed by butanediol distilled off and the temperature was raised to 250° C. at about 1° C./min. At about 250° C., a vacuum was applied gradually to reach <1 mBar in about 15 minutes. The polymerization was continued until the maximum possible torque reading was achieved, after which the vacuum was broken, the bottom valve was opened and the polymer strand pulled through a water bath. The polymer had a melting temperature of 226° C., a crystallization temperature of 188° C. and a molecular weight of 59000. Residual amines, measured by potentiometric titration with HClO$_4$ in m-cresol at 60° C., amounted to 22 µeq/g.

13. P44-10 via amide-salt

To a 5 l reaction vessel was charged 106 g 1,4-diaminobutane (1.2 Mole) and 200 g terephthalic acid (1.2 Mole) with 1 L of demineralized water at 60° C. The salt was precipitated by cooling to room temperature and addition of 2 L of ethanol. After filtration, washing with ethanol and drying, 287 g "4T" salt were obtained. The salt was characterized with NMR and its nitrogen-content. The diaminobutane to terephthalic acid ratio was 1:1 (molar). To a 2 L stainless steel reactor was charged 790 g DMT, 140 g of the "T4"-salt, 557 g BDO and 1.1 g Ti(OC$_4$H$_9$)$_4$ and the reactor heated to about 175° C. Methanol started distilling and the temperature was raised to about 250° C. over about 1.5 hours. The salt disappeared at about 210° C. Polymerization was continued for about 1.5 hours under vacuum (<1 mBar) at the end of which the torque reading became maximum, the polymerization was stopped and the polymer was recovered from the reactor. Its melting temperature was 233° C., crystallization temperature 192° C., molecular weight 55000 and HClO$_4$-titratables 49 µeq/g. weight 55000 and HClO$_4$-titratables 49 µeq/g.

Example 2

Blends containing PPE and PEA in comparison to PBT are illustrated in Table 2.

TABLE 2

| Sample | 1 | 2 | 3 | 4 | 5 | 6 | 7 | 8 |
|---|---|---|---|---|---|---|---|---|
| PPE | 50 | 50 | 0 | 0 | 9 | 9 | 0 | 0 |
| PPE-FA | 0 | 0 | 55 | 55 | 0 | 0 | 0 | 0 |
| PPE-OE | 0 | 0 | 0 | 0 | 36 | 36 | 33 | 33 |
| P44-10 | 0 | 0 | 0 | 0 | 0 | 0 | 0 | 67 |
| P44-20 | 0 | 50 | 0 | 45 | 0 | 45 | 0 | 0 |
| PBT | 50 | 0 | 45 | 0 | 45 | 0 | 67 | 0 |
| HIPS | 0 | 0 | 0 | 0 | 10 | 10 | 0 | 0 |
| Stabilizer | 0.2 | 0.2 | 0.2 | 0.2 | 0.2 | 0.2 | 0.2 | 0.2 |
| Properties | | | | | | | | |
| Tensile modulus M · Pa. | 2325 | 2560 | 2488 | 2446 | 2459 | 2471 | 2640 | 2471 |
| Tensile Elongation % | 0.9 | 1.0 | 1.5 | 1.7 | 4.9 | 3.0 | 2.4 | 2.1 |
| Morphology | poor | poor | poor | poor | good | good | good | good |
| un-Notched Izod kJ/m$^2$ | — | — | 7.4 | 9.0 | 29.8 | 20.8 | — | — |
| Heat Sag mm | | | | | | | | |
| 203° C. | 5.3 | 4.0 | — | — | — | — | — | — |
| 218° C. | 69.0 | 47.0 | — | — | — | — | — | — |
| Vicat B/120, °C. | — | — | — | — | 176 | 175 | 190 | 194 |
| G'215° C. M · Pa. | 40 | 250 | — | — | — | — | — | — |

Comparison of Sample 1, a control of PPE and PBT, to Sample 2 illustrates the surprising improved heat resistance of compositions containing PEA over PBT. As noted by the heat sag at 218° C., Sample 2 shows an improvement of over 20 mm when compared to the same composition made from PBT. The improvement in heat resistance is also noted by the four-fold increase in the elastic modulus measured at 215° C. for Sample 2 over Sample 1.

Heat sag is determined by means of a horizontally mounted tensile bar (ISO), clamped on one end, and allowed to bend under its own weight during 1 hour at 120° C. The vertical displacement of the free end is called the "heat sag" and is an indication of the material's behavior in paint-ovens. The lower the heat sag number the better a material is able to withstand the temperature. Improved (e.g., lower value) heat sag is especially important for painted automotive parts which have to withstand the paint oven temperatures.

Samples 3 and 4 are blends of PPE and PBT or PEA wherein the PPE has been functionalized with fumaric acid to make what is thought to be an anhydride functionalized PPE (PPE-FA). PPE-FA is known to be an efficient compatibilizing PPE for polymers which contain amine moieties such as, for example, nylon resins. Surprisingly, the PEA containing blend made with PPE-FA (Sample 4) shows signs of improved compatibilization with the PEA as indicated by the increased tensile elongation when compared to Sample 2 containing an unfunctionalized PPE. Optimization of the PEA to increase the amine level in the PEA would improve the efficiency of the PPE-FA compatibilization. Such optimization is readily achieved by those skilled in the art without undue experimentation.

Samples 5 and 6 contain an orthoester functionalized PPE (PPE-OE) in addition to some unfunctionalized PPE for both PBT and PEA blends. Surprisingly, good compatibilization was achieved with the PPE-OE and the PEA as indicated by the improved tensile elongation, good impact strength and improved morphology as compared to the Samples 1 and 2 made without an orthoester functionalized PPE.

Samples 7 and 8 illustrate a comparison of a P44-10 resin in a blend containing an orthoester functionalized PPE (PPE-OE) as compared to the same blend with PBT in place of the P44-10. As seen by the data, good properties were obtained for both blends but the blend with the PEA, sample 8, had a 4° C. higher Vicat B/120 than did the blend containing the PBT. The higher Vicat B/120 temperature is indicative of a higher use temperature for many applications.

Many variations may suggest themselves to those skilled in the art from the above detailed descriptions without departing from the scope or spirit of the invention. It is, therefore, to be understood that changes may be made in the particular embodiments of the invention as defined by the appended claims.

What is claimed is:

1. A thermoplastic resin blend comprising:
   A. a poly(phenylene ether) resin comprising a poly(phenylene ether) resin having orthoester functional moieties; and
   B. a polyesteramide resin containing at least about 10 mole % aliphatic moieties, wherein the polyesteramide resin comprises units represented by the amide formula (I):

and the ester formula (II)

2. The thermoplastic blend of claim 1, wherein said substantially aliphatic polyesteramide contains at least about 20 mole percent aliphatic residues in the polyesteramide.

3. The thermoplastic resin blend of claim 1, wherein the ratio of (I) to (II) is less than 1:1.

4. The thermoplastic resin blend of claim 1, wherein (I) is derived from a reaction between at least one amine group of the general formula (III):

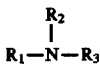

and compounds comprising at least one moiety capable of forming a carboxyl group, and capable of reacting with the amine and of the general formula (IV):

wherein each $R_1$, $R_2$ and $R_3$ is independently selected from a group consisting of a hydrogen, a $C_{1-20}$ alkylene and $C_{6-20}$ arylene group with the proviso that at least one of $R_1$, $R_2$, or $R_3$ also contain at least one reactive moiety selected from the group consisting of hydroxyl, amine, carboxylic acid, imido, anhydride, ester, epoxy, carboxylic acid salt, and mixtures thereof, and wherein $R_4$ is a $C_{1-20}$ alkylene or $C_{6-20}$ arylene that contain at least one reactive moiety selected from the group consisting of amine, hydroxyl, carboxylic acid, imido, anhydride, ester, epoxy, carboxylic acid salt, and mixtures thereof; and wherein X is a leaving group capable of being displaced by a nucleophilic species.

5. The thermoplastic resin blend of claim 1, wherein (I) is derived from a reaction between at least one amine group of the general formula (III):

and compounds having at least one moiety capable of forming a carboxyl group, and capable of reacting with the amine having the formula (IV):

wherein each $R_1$, $R_2$ and $R_3$ can independently be a hydrogen, a $C_{1-20}$ alkylene or $C_{6-20}$ arylene group with the proviso that at least one of $R_1$, $R_2$ or $R_3$ also contain at least one reactive moiety selected from the group consisting of hydroxyl, amine, carboxylic acid, imido, anhydride, ester, epoxy, carboxylic acid salt, and mixtures thereof, and wherein $R_4$ is a $C_{1-20}$ alkylene or $C_{6-20}$ arylene that contain at least one reactive moiety selected from the group consisting of amine, hydroxyl, carboxylic acid, imido, anhydride, ester, epoxy, carboxylic acid salt, or mixtures of the foregoing; and wherein x is a leaving group capable of being displaced by a nucleophilic species.

6. The thermoplastic resin blend of claim 5, wherein (I) is derived from a diamine or mixture of primarily diamines.

7. The thermoplastic resin blend of claim 6, wherein said diamine or mixture of diamines comprise alkane diamines wherein said alkane groups independently have from 2 to 12 carbon atoms.

8. The thermoplastic resin blend of claim 7, wherein said diamine and mixture of diamines are independently selected from the group consisting of ethane diamine, butane diamine, hexane diamine, and mixtures thereof.

9. The thermoplastic resin blend of claim 5, wherein at least 80% of the units of formula (I) are separated by at least one unit of formula (II).

10. The thermoplastic resin blend of claim 9, wherein at least 85% of the units of formula (I) are separated by at least one unit of formula (II).

11. The thermoplastic resin blend of claim 1, wherein (II) is derived from units of formula (IV):

units of formula (VI):

wherein X is a leaving group capable of being displaced by (VI); and $R_4$ and $R_5$ are each independently alkyl or aryl and each $R_4$ and $R_5$ comprise a moiety selected from a group consisting of hydroxy, carboxylic acid, lower alkyl or aryl ester of carboxylic acid, epoxy, carboxylic acid ammonium salt and anhydride.

12. The thermoplastic resin blend of claim 11, wherein (IV) is a carboxylic acid or carboxylic acid derivative containing leaving group X; and wherein $R_4$ is alkyl or aryl, each having 1 to 12 carbon atoms; and wherein each $R_4$ also contains one moiety selected from the group consisting of hydroxy, carboxylic acid, and lower alkyl or aryl ester of a carboxylic acid.

13. The thermoplastic resin blend of claim 12, wherein (VI) is an alcohol and $R_5$ is alkyl or aryl, each having 1 to 12 carbon atoms; and wherein $R_5$ also contains a moiety selected from the group consisting of hydroxy, carboxylic acid, and lower alkyl or aryl ester of a carboxylic acid.

14. The thermoplastic resin blend of claim 13, wherein X is hydroxy, lower alkyl, lower aryl, halogen, or acid anhydride.

15. The thermoplastic resin blend of claim 1, wherein said polyesteramide is derived from a diamide or a mixture of diamides of the formula (IX):

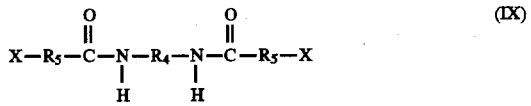

wherein each X is, independently, a moiety selected from the group consisting of hydroxy, carboxylic acid, a lower alkyl or aryl ester of a carboxylic acid, epoxy, carboxylic acid ammonium salt and an anhydride; and $R_4$ and $R_5$ are, independently, alkyl or aryl groups, each having up to 12 carbon atoms.

16. The thermoplastic resin blend of claim 15, wherein said polyesteramide is derived from a diol having 2–12 carbon atoms, and wherein the average number of carbon atoms in said diol is equal to the average number of carbon atoms in $R_4$ of formula (IX).

17. The thermoplastic resin blend of claim 15, wherein said polyesteramide is derived from butane diol.

18. The thermoplastic resin blend of claim 1, wherein said polyesteramide is derived from a diamide or a mixture of diamides of the formula (VIII):

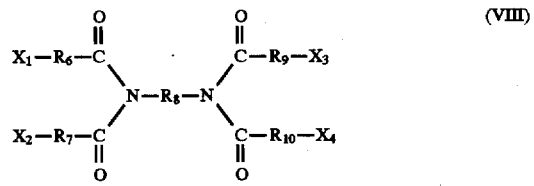

wherein $R_6$, $R_7$, $R_8$ and $R_9$ are, independently, aryl or alkyl groups, each having up to 12 carbon atoms, and wherein each $R_6$ and $R_7$ and each $R_9$ and $R_{10}$ may be connected to form a five or six membered ring structure; and each $X_1$, $X_2$, $X_3$ and $X_4$ is, independently, a moiety selected from the group consisting of hydroxy, carboxylic acid, a lower alkyl of a carboxylic acid, a lower aryl ester of a carboxylic acid, epoxy, carboxylic acid ammonium salt, carboxylic acid anhydride and hydrogen provided that at least one of $X_1$ or $X_2$ and $X_3$ or $X_4$ is not hydrogen.

19. The thermoplastic resin blend of claim 1, wherein the poly(phenylene ether) resin having orthoester functional moieties is present in an amount effective to improve the compatibility between the various components in the composition.

20. The thermoplastic resin blend of claim 1, wherein said blend further comprises at least one additional additive selected from the group consisting of impact modifiers, reinforcing fillers or fibers, processing aids, thermal or oxidative stabilizers, electromagnetic modifiers, flame retardants, colorants, neutralizing agents, stabilizers, nucleating agents, and compatibilizers.

21. The thermoplastic resin blend of claim 1, wherein said polyesteramide is the continuous phase.

22. The thermoplastic blend of claim 1, wherein said substantially aliphatic polyesteramide has the general formula (X):

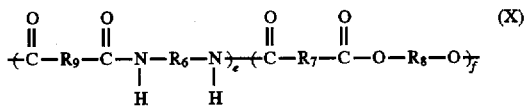

wherein $R_6$, $R_7$, $R_8$, and $R_9$ are independently $C_{1-20}$ alkylene or $C_{6-20}$ arylene and wherein e and f are each an integer greater than or equal to 1.

23. The thermoplastic blend of claim 22, wherein $R_7$ and $R_9$ are the same and are arylene and $R_6$ and $R_8$ are the same and are $C_{2-6}$ alkylene.

24. The thermoplastic blend of claim 23, wherein $R_7$ and $R_9$ are each a para-phenylene radical.

25. The thermoplastic blend of claim 22, wherein e is 1 or a mixture of 1 and higher integers wherein the fraction of said higher integers is less than about 15%.

26. The thermoplastic blend of claim 22, wherein the ratio of e/f is between about 0.05 and about 1.

27. The thermoplastic blend of claim 26, wherein the ratio of e/f is between about 0.05 and 0.5.

28. The thermoplastic blend of claim 22, wherein said substantially aliphatic polyesteramide has an inherent viscosity exceeding 0.4 dl/g, as determined in phenol/tetrachloroethane (50:50 vol) at 25° C. using a solution of 0.5% w/v solution.

29. A thermoplastic resin blend of poly(phenylene ether) resin and polyesteramide consisting essentially of:
A. a poly(phenylene ether) resin comprising a poly(phenylene ether) resin having orthoester functional moieties; and
B. a polyesteramide resin containing at least about 10 mole % aliphatic moieties comprising units represented by the amide formula (I):

and the ester formula (II):

30. A process for preparing a blend of poly(phenylene ether) resin and polyesteramide comprising the steps of:
1. reacting:
compounds containing units of the formula (I):

with a diol and with compounds containing units of the formula (II):

to produce a polyesteramide resin containing at least about 10 mole % aliphatic moieties; and
2. blending said polyesteramide resin with a poly(phenylene ether) resin comprising a poly(phenylene ether) resin having orthoester functional moieties.

* * * * *